United States Patent [19]

Slayton

[11] Patent Number: 5,027,024
[45] Date of Patent: Jun. 25, 1991

[54] DYNAMOELECTRIC MACHINE WITH BEARING RETAINER

[75] Inventor: Alvin L. Slayton, Columbus, Miss.

[73] Assignee: United Technologies Motor Systems, Inc., Columbus, Miss.

[21] Appl. No.: 539,504

[22] Filed: Jun. 18, 1990

[51] Int. Cl.⁵ .......................... H02K 7/10; F16C 35/06
[52] U.S. Cl. ....................................... 310/90; 310/83; 384/626
[58] Field of Search .................... 74/425; 310/83, 89, 310/90, 42; 384/626, 903

[56] References Cited

U.S. PATENT DOCUMENTS

| | | | |
|---|---|---|---|
| 2,464,847 | 3/1949 | Coffey | 310/83 UX |
| 2,772,596 | 12/1956 | Trussell | 384/626 |
| 4,364,615 | 12/1982 | Euler | 384/903 |
| 4,399,380 | 8/1983 | Hirano | 310/89 |
| 4,730,995 | 3/1988 | Dewhirst | 384/626 |

Primary Examiner—Steven L. Stephan
Assistant Examiner—D. L. Rebsch
Attorney, Agent, or Firm—Ronald G. Cummings

[57] ABSTRACT

A dynamoelectric machine in the form of a windshield wiper motor having an armature shaft with a worm driving a worm gear mounted in a gear end housing. The armature shaft bearing is positioned against a shoulder on the shaft by a washer and push-on retainer. The bearing is slip-fit mounted in the gear end housing and a U-shaped retainer is mounted in a slot in the gear end housing adjacent the bearing such that the retainer engages the bearing to retain it against axial loading on the shaft. A bowed washer is mounted to engage the bearing to urge it against the retainer.

19 Claims, 1 Drawing Sheet

DYNAMOELECTRIC MACHINE WITH BEARING RETAINER

TECHNICAL FIELD

This invention relates to dynamoelectric machines and more particularly to a bearing mounting assembly for such machines.

BACKGROUND OF THE INVENTION

In dynamoelectric machines such as small fractional-horsepower motors, the armature shaft is supported by antifriction bearings mounted within recesses or bearing seats in the opposite endcaps of the motor housing. Various techniques have been utilized to retain the bearing in the recess. Some of the common techniques include press-fit mounting, adhesives and various mechanical means to capture the bearing in place. In some instances, a combination of two or more techniques may be utilized.

Such techniques are generally not satisfactory in applications where the motor is subjected to severe axial loading and/or impact. For example, electric windshield wiper motors generally experience severe axial loading and/or impact which tends to hammer the bearing out of the bearing seat. In a typical windshield wiper motor configuration, the motor armature drives a worm gear through a worm on the armature shaft. In turn, the worm gear drives a shaft with a crank arm. Various types of linkage interconnect the crank arm to another crank arm which is in turn connected to the windshield wiper arms. As the armature rotates, the crank arm on the worm gear converts the rotary motion of the worm gear to a reciprocating motion that is transmitted to the windshield wiper arms. As the wiper arms reach the end of travel across the windshield, inertia, together with the sudden reversal of direction, transmits high loading back through the linkages to the gear. This high loading is in turn transmitted to the motor armature shaft. The armature shaft thrusts axially on the bearing in such a direction as to tend to force the bearing out of its seat. Consequently, the bearing retaining means must be sufficient to retain the bearing during severe axial loading in order to prevent dislodgement of the bearing and a breakdown of the motor.

SUMMARY OF THE INVENTION

It is an object of the present invention to provide a new and improved dynamoelectric machine which has particular utility in applications of severe axial loading or impact.

Another object of the invention is to provide a new and improved windshield wiper motor.

A further object of the invention is to provide a bearing mounting assembly which accommodates severe axial loading and/or impact.

A further object of the invention is to provide such a bearing mounting assembly which is particularly adapted to automated motor assembly.

A still further object of the invention is to provide such a bearing mounting assembly which is cost efficient, durable in use, and affords ease in assembly and service.

Other objects will be in part obvious and in part pointed out more in detail hereinafter.

Accordingly, it has been found that the foregoing and related objects are attained and the disadvantages of the prior art are overcome in a dynamoelectric machine having a housing assembly with a main housing section, an end housing section, and an armature journaled within the main housing section for rotation. The armature has a shaft extending axially through the end housing section with an antifriction bearing secured to the shaft. The bearing is mounted in a bearing seat in the end housing section to support the shaft. A bearing retainer is mounted adjacent the bearing seat in engagement with the inner face of the bearing to retain the bearing in the bearing seat against axial loading or impact to the shaft. In a preferred embodiment, the bearing retainer is a U-shaped plate and the end housing section includes a slot for mounting the plate in engagement with the bearing. In assembly, the retainer is slidably mounted within the slot and locked therein by a removable cover of the end housing section.

BEST MODE FOR CARRYING OUT THE INVENTION

Figure 1:
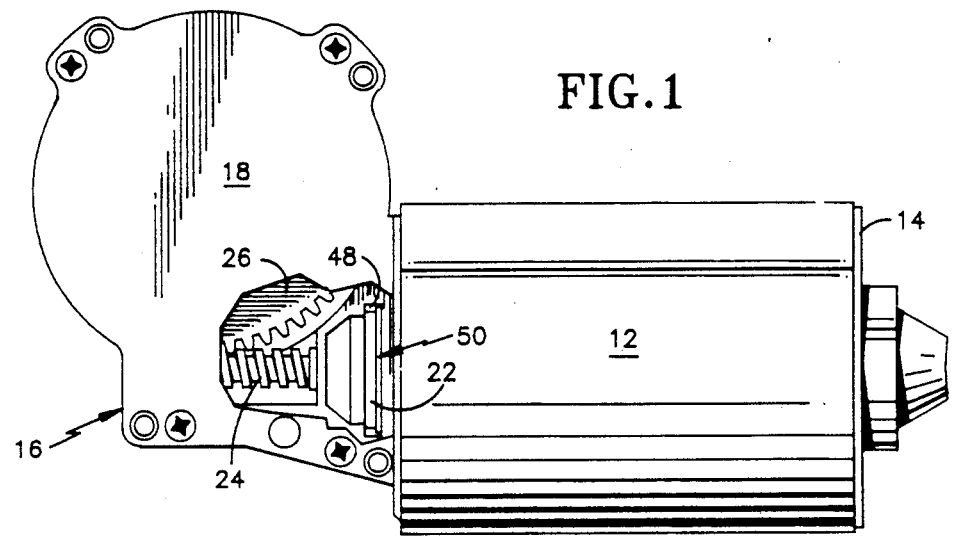
FIG. 1 is a partly broken away plan view of a windshield wiper motor of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Figure 3:
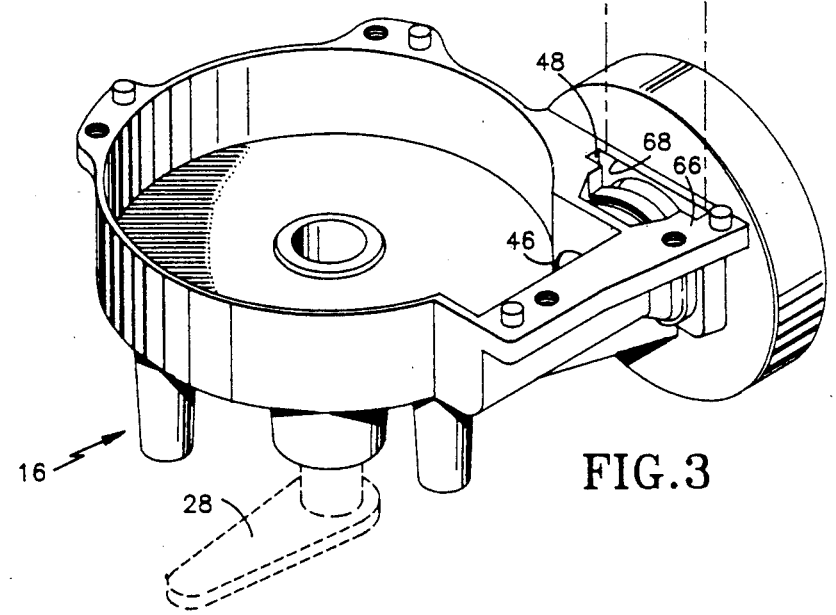
FIG. 3 is a perspective view of the gear end housing and bearing retainer of the motor of FIG. 1.

Referring to FIG. 1, a dynamoelectric machine according to the present invention is shown in the form of a windshield wiper motor which generally comprises a motor housing, an armature assembly, and a gear assembly. The motor housing for the windshield wiper motor of FIG. 1 comprises a cylindrical motor housing section 12 enclosed at one end by endcap 14 and enclosed at the other end by gear end housing 16 which is best seen in FIG. 3. The gear end housing 16 is closed by a removable cover plate 18.

The armature assembly as mounted in the main housing section 12 is generally of conventional design and need not be described in great detail for purposes of the present invention. In a known manner, the armature assembly is journaled in the housing section 12 by a self-aligning bronze bearing (not shown) with one end of the armature shaft 20 being supported in an antifriction bearing mounted within the endcap 14. As will be described in detail, the other end 21 of the shaft 20 is supported by an antifriction bearing 22 mounted in the gear end housing 16.

The shaft 20 has a worm 24 which drives the worm gear 26 mounted within the gear end housing 16. The worm gear 26 is connected to the crank arm 28 which is in turn connected to linkage (not shown) for converting the rotary motion of the worm gear into oscillating motion suitable for the back and forth movement of the windshield wiper blades.

Figure 2:
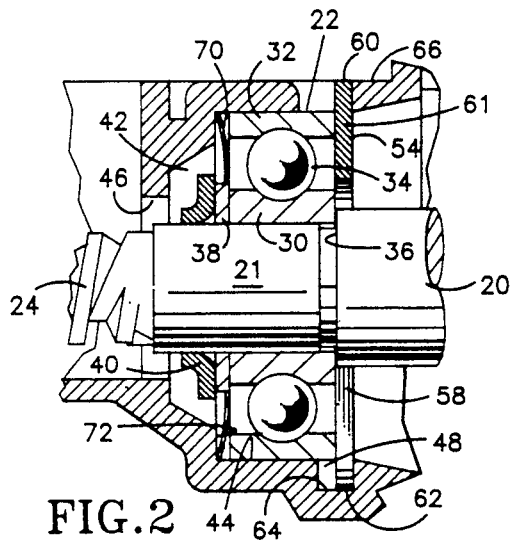
FIG. 2 is an enlarged view, partly in section and partly broken away, of the bearing mounting assembly of the motor of FIG. 1.

Referring to FIG. 2, the bearing 22 is a conventional ball bearing assembly having an inner race 30, an outer race 32 and a plurality of ball bearing elements 34. The armature shaft 20 has a shoulder 36 and the bearing 22 is positioned on the shaft such that the inner race 30 abuts the shoulder 36. The inner race is press-fit mounted to the shaft sufficiently to prevent angular rotation of the inner race. A flat washer 38 and push-on retainer 40 retain the bearing 22 against the shoulder 36. The flat washer 38 engages the inner race 30 and is held in place against the bearing by the push-on retainer 40. The push-on retainer 40 is the type that will slip along the shaft in one direction but will bite into the shaft if force is applied thereto in the opposite direction. Other types of retainers for holding the bearing against the shaft shoulder may be utilized.

The end housing 16 has a recess 42 which forms a bearing seat 44 for slip-fit mounting the bearing 22 sufficiently to prevent angular rotation of the outer race. The worm 24 extends from the shaft 20 through an opening 46 into the gear end housing to engage the worm gear 26. In operation, the armature shaft 20 would be subject to axial loading or impact to the right as viewed in FIG. 2 which would tend to force the bearing out of the bearing seat 44.

The gear housing 16 has a slot 48 adjacent the bearing seat 44 configured to slidably received the bearing retainer 50. The retainer plate 50 is generally U-shaped with a slot 51 formed between the parallel opposite sides 56, 58 and has opposite planar faces 52, 54. The sides 56, 58 have rounded terminal ends 62 and are orthogonal to the edge 60 of base portion 61 to form square corners.

The slot 48 is orthogonal to the shaft 20 and is configured and dimensioned for a loose-fit mount of the retainer 50. As seen in FIG. 2, when the retainer 50 is mounted within the slot 48, the terminal ends 62 of the retainer engaged the bottom surface 64 of the slot 48 and the top edge 60 of the retainer is at or below the adjacent upper surface 66 of the gear end housing so that the retainer 50 is locked in place by attachment of the cover 18. The slot 48 has a planar inner wall portion 68 disposed toward the armature assembly as best seen in FIG. 3. A circumferential portion of the planar face 54 of retainer 50 abuts the inner wall 68 of slot 48 to distribute axial loading forces on the bearing to the gear end housing. The opposite face 52 of the retainer 50 abuts the inwardly disposed side of the outer race 32 of bearing 22.

A bowed or wave washer 70 is mounted in compression between the outwardly disposed side of the bearing 22 and an annular shoulder 72 in the wall of gear end housing 16 which forms the recess 42. The bowed washer is dimensioned to engage the outwardly disposed side of the outer race 32 and is concentrically positioned about the flat washer 48. The bowed washer 70 urges the bearing 22 against the retainer 50 so as to ensure zero endplay in the armature. Zero endplay contributes to a quieter operating motor in that it prevents any "clunking" sound as the wiper arms reverse their direction of travel. Other means for positioning the bearing snugly against the retainer 50 may be utilized such as mechanical means or other forms of resilient biasing means.

The cover plate 18 encloses the gear end housing and also serves to lock the retainer 50 in slot 48. The cover plate 18 is secured to the gear end housing by bolts or the like and is easily removable for service, etc.

In assembly, the retainer 50 engages the outer race of the bearing to securely hold the bearing in the bearing seat against even severe axial loading and impact. The flat surface 52 of the retainer 50 provides substantial contact surface area to the outer race of the bearing to secure the bearing in place.

The bearing mounting assembly of the present invention is particularly suited for automated assembly because of the manner of positioning the components. The bearing 22 is slidably positioned on armature shaft 20 against the shoulder 36 with the washer 38 and the push-on retainer 40 being slidably mounted on the shaft 20 to hold the bearing against the shoulder 36. The bowed washer 70 is positioned in the recess 42 against the shoulder 72 and the bearing 22 as mounted to the shaft 20 is slip-fit within the bearing seat 44 against the washer 70 so as to compress the washer. The retainer 50 is slidably inserted in the slot 48 so as to engage the inner side of the outer race 32. In slidably inserting the retainer 50, the abutment of the ends 62 of the retainer with the bottom surface 64 of slot 48 establishes the proper positioning of the retainer 50 and, as such, it is particularly suited for automated assembly. Thereafter, the cover 18 is secured to the gear end housing 16.

As can be readily appreciated, a new and improved dynamoelectric machine has been described which has particular utility in machine applications which may encounter severe axial loading or impact. The bearing mounting assembly of the present invention is cost efficient to manufacture, durable in use and is relatively easy to assemble and service.

As will be apparent to persons skilled in the art, various modifications and adaptations of the structure above described will become readily apparent without departure from the spirit and scope of the invention, the scope of which is defined in the appended claims.

What is claimed is:

1. A dynamoelectric machine comprising:
    a housing with a main housing section and an end housing section,
    an armature journaled within the main housing section for rotation, said armature having a shaft extending axially through said end housing section,
    an antifriction bearing mounted to said shaft and mounted in a bearing seat in said end housing section to support said shaft, said bearing having inner and outer ends with said inner end being disposed toward said armature, and
    means for retaining the bearing within said bearing seat against axial loading or impact to said shaft, said retaining means being mounted within said end housing section so as to retentively engage a substantial portion of the inner end of said bearing sufficient to secure said bearing against axial loading or impact to said shaft.

2. The device of claim 1 wherein said end housing comprises means for mounting said retaining means in engagement with said inner end of said bearing, said mounting means being configured for slidable insertion of said retaining means in assembly.

3. A dynamoelectric machine comprising:
    a housing with a main housing section and an end housing section,
    an armature journaled within the main housing section for rotation, said armature having a shaft extending axially through said end housing section,
    an antifriction bearing mounted to said shaft and mounted in a bearing seat in said end housing section to support said shaft, said bearing having inner and outer ends with said inner end being disposed toward said armature, means for retaining the bearing within said bearing seat against axial loading or impact to said shaft, said retaining means being mounted within said end housing section so as to retentively engage the inner end of said bearing, and said end housing comprising means for mounting said retaining means in engagement with said inner end of said bearing, said mounting means comprising a slot in said end housing section configured for slidably receiving and supporting said retaining means in engagement with said bearing.

4. The device of claim 3 wherein said retaining means comprises a U-shaped plate having a planar face, said plate being mounted within said slot with said planar face engaging said bearing 5. A dynamoelectric machine comprising:

a housing with a main housing section and an end housing section, an armature journaled within the main housing section for rotation, said armature having a shaft extending axially through said end housing section, an antifriction bearing mounted to said shaft and mounted in a bearing seat in said end housing section to support said shaft, said bearing having inner and outer ends with said inner end being disposed toward said armature, and means for retaining the bearing within said bearing seat against axial loading or impact to said shaft, said retaining means being mounted within said end housing section so as to retentively engage the inner end of said bearing, said retaining means comprising a U-shaped plate and said end housing section having a slot configured to slidably mount said plate to engage said bearing, said slot being disposed adjacent said bearing seat and orthogonal to said shaft.

6. The device of claim 5 wherein said slot has an access opening for insertion and withdrawal of said plate and said end housing section has a removable cover disposed across said access opening to retain said plate within said slot.

7. The device of claim 1 which comprises means for urging said bearing against said retainer means.

8. The device of claim 7 wherein said bearing seat is a recess formed in said end housing section to mount said bearing, said urging means being mounted within said recess in engagement with the outer end of said bearing.

9. The device of claim 8 wherein said urging means comprises a resilient biasing member.

10. The device of claim 8 wherein said urging means comprises a bowed washer disposed so as to be in compression in assembly.

11. The device of claim 7 wherein said bearing is a rolling element bearing having an inner race and an outer race, said bearing seat is a recess formed in said end housing to mount said bearing and said urging means is an annular resilient biasing member mounted within said recess in engagement with said outer race to urge said bearing against said retainer means.

12. A dynamoelectric machine comprising:

a housing with a main housing section and an end housing section, an armature journaled with the main housing section for rotation, said armature having a shaft extending axially through said end housing section, an antifriction bearing mounted to said shaft and mounted in a bearing seat in said end housing section to support said shaft, said bearing having inner and outer ends with said inner end being disposed toward said armature, means for retaining the bearing within said bearing seat against axial loading or impact to said shaft, a said retaining means being mounted within said end housing section so as to retentively engage the inner end of said bearing, means for using said bearing against said retainer means, said bearing being a rolling element bearing having an inner race and an outer race, said bearing seat being a recess formed in said end housing to mount said bearing and said urging means being an annular resilient biasing member mounted within said recess in engagement with said outer race to urge said bearing against said retainer means, and said retaining means comprising a U-shaped plate and said end housing section having a slot configured to slidably mount said plate to engage said bearing, said slot being disposed adjacent said recess and orthogonal to said shaft, said plate being configured to engage said outer race of said bearing and retain said bearing against axial loading to impact to said shaft.

13. The device of claim 1 which comprises said shaft having an annular shoulder, said bearing being a rolling element bearing having an inner race and an outer race with said inner race abutting said shoulder, means for securing said bearing against said shoulder, and means for urging said bearing against said retaining means.

14. The device of claim 13 wherein said means for securing said bearing against said shoulder comprise a washer engaging said inner race and a push-on shaft retainer secured to said shaft so as to maintain said washer against said inner race.

15. The device of claim 14 wherein said end housing section comprises a recess forming said bearing seat to mount said bearing and said means for urging said bearing against said retaining means comprises a bowed washer mounted in said recess.

16. The device of claim 14 wherein said dynamoelectric machine is a windshield wiper motor with said end housing section comprising a gear end housing for a worm gear driven by a worm on said armature shaft.

17. The device of claim 1 wherein said dynamoelectric machine is a windshield wiper motor with said end housing section comprising a gear end housing for a worm gear driven by a worm on said armature shaft.

18. The device of claim 1 wherein said inner end of said bearing has first and second opposite sides and said retaining means engages said first and second sides.

19. The device of claim 18 wherein said inner end of said bearing has a top portion and said retaining means engages said top portion.

* * * * *

UNITED STATES PATENT AND TRADEMARK OFFICE
CERTIFICATE OF CORRECTION

PATENT NO. : 5,027,024

DATED : June 25, 1991

INVENTOR(S) : Alvin L. Slayton

It is certified that error appears in the above-identified patent and that said Letters Patent is hereby corrected as shown below:

Col. 5, line 15, after "bearing", insert --.--.

Col. 6, line 1, "with" should be --within--.

Col. 6, line 14, "using" should be --urging--.

Col. 6, line 29, "to" should be --or--.

Signed and Sealed this

Third Day of November, 1992

Attest:

DOUGLAS B. COMER

*Attesting Officer*         Acting Commissioner of Patents and Trademarks